United States Patent
Orr

(10) Patent No.: US 8,305,923 B1
(45) Date of Patent: *Nov. 6, 2012

(54) CUSTOM AUTOMATIC REMOTE MONITORING FOR NETWORK DEVICES

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 227 days.

This patent is subject to a terminal disclaimer.

(21) Appl. No.: 12/861,294

(22) Filed: Aug. 23, 2010

Related U.S. Application Data

(63) Continuation of application No. 11/342,481, filed on Jan. 30, 2006, now Pat. No. 7,787,390.

(51) Int. Cl.
*H04L 12/26* (2006.01)
*H04L 12/66* (2006.01)
*G06F 7/00* (2006.01)
*G06F 17/00* (2006.01)

(52) U.S. Cl. ........ 370/252; 370/256; 370/289; 370/401; 707/665; 709/224; 726/13

(58) Field of Classification Search ............... 370/252, 370/256, 389, 401; 707/665; 709/224; 726/13
See application file for complete search history.

(56) References Cited

U.S. PATENT DOCUMENTS

| | | |
|---|---|---|
| 6,456,624 B1 | 9/2002 | Eccles et al. |
| 6,674,758 B2 | 1/2004 | Watson |
| 6,792,456 B1 | 9/2004 | Hellerstein et al. |
| 7,185,368 B2 | 2/2007 | Copeland, III |
| 7,231,436 B1 | 6/2007 | Dalfo et al. |
| 7,239,409 B2 | 7/2007 | Parry |
| 7,266,754 B2 | 9/2007 | Shah et al. |
| 7,523,137 B2 | 4/2009 | Kass et al. |
| 7,653,633 B2 | 1/2010 | Villella et al. |
| 2005/0289226 A1 | 12/2005 | Mohammed et al. |
| 2006/0227997 A1 | 10/2006 | Au et al. |
| 2006/0242694 A1 | 10/2006 | Gold et al. |

*Primary Examiner* — Alpus H Hsu

(57) ABSTRACT

A network device including a port configured to exchange packets of data with one or more networks. The network device further includes a rule storing circuit is configured to store a plurality of event classification rules. Each of the event classification rules describes at least one event characteristic for an event in the network device. At least one of the event classification rules includes a change in state of the at least one port of the network device. The change in state of the at least one port is generated by a change in spanning tree mode. The network device further includes an event classifier is configured to identify events having the at least one event characteristic described by any of the event classification rules, and a plurality of event counters configured to count the events identified by the event classifier for a respective one of the event classification rules.

18 Claims, 5 Drawing Sheets

CUSTOM AUTOMATIC REMOTE MONITORING FOR NETWORK DEVICES

CROSS-REFERENCE TO RELATED APPLICATIONS

This application is a continuation of U.S. Non-Provisional patent application Ser. No. 11/342,481, filed Jan. 30, 2006. The disclosure of the above application is incorporated herein by reference in its entirety.

BACKGROUND

The present invention relates generally to data communications. More particularly, the present invention relates to custom remote automatic monitoring for network devices.

It is often desirable to remotely monitor network devices such as network switches and the like. One such technique is described in RFC 3577—Introduction to the Remote Monitoring (RMON) Family of MIB Modules. Another technique known as SMON is described in RFC 2613—Remote Network Monitoring MIB Extensions for Switched Networks Version 1.0. While useful, these techniques are limited in the sorts of monitoring that can take place.

SUMMARY

In general, in one aspect, the invention features an apparatus comprising at least one port to exchange packets of data with one or more networks; a user interface circuit to establish a plurality of event classification rules, wherein each of the event classification rules describes at least one event characteristic for an event in the apparatus, and wherein at least one of the event classification rules describes a plurality of the event characteristics; an event classifier to identify events having the at least one event characteristic described by any of the packet classification rules; and a plurality of event counters each to count the events identified by the event classifier for a respective one of the event classification rules.

In some embodiments, the event characteristics comprise at least one of the group consisting of: a change in state of one of the ports; a change in state of a memory of the apparatus; a change in state of a processor of the apparatus; a reboot of the apparatus; an interface attribute change; a timeout; a user login; and a user logout. In some embodiments, the event characteristics comprise packet characteristics of the packets of data. In some embodiments, the packet characteristics comprise at least one of the group consisting of: destination addresses of the packets of data; source addresses of the packets of data; types of the packets of data; identifiers of network interfaces of the apparatus receiving the packets of data into the apparatus; identifiers of the network interfaces of the apparatus transmitting the packets of data from the apparatus; data rates of the packets of data; quantities of data in the packets of data; identifiers of network devices in the paths of the packets of data; and times of occurrence of the packets of data. In some embodiments, each of the event classification rules describes an event counter condition and a threshold action, the apparatus further comprising: an action circuit to initiate the respective threshold action for each of the event classification rules when the respective event counter meets the respective event counter condition. In some embodiments, the event counter conditions describe at least one of the group consisting of: an occurrence of a predetermined count of the event counter; a predetermined change in a count of the event counter; and a predetermined change in the count of the event counter during a predetermined interval. In some embodiments, the threshold actions comprise at least one of the group consisting of: implementing a further one of the event classification rules; closing one or more of the ports; changing logical attributes of one or more of the ports; manifesting an alarm indication; and dropping subsequent packets of data having the at least one of the packet characteristics described by the respective event classification rule. In some embodiments, at least one of the event classification rules includes a conditional statement. Some embodiments comprise a network switch comprising the apparatus. Some embodiments comprise a router comprising the apparatus. Some embodiments comprise a network interface controller comprising the apparatus.

In general, in one aspect, the invention features an apparatus comprising: at least one port means for exchanging packets of data with one or more networks; user interface means for establishing a plurality of event classification rules, wherein each of the event classification rules describes at least one event characteristic for an event in the apparatus, and wherein at least one of the event classification rules describes a plurality of the event characteristics; event classifier means for identifying events having the at least one event characteristic described by any of the packet classification rules; and a plurality of means for counting each for counting the events identified by the event classifier means for a respective one of the event classification rules.

In some embodiments, the event characteristics comprise at least one of the group consisting of: a change in state of one of the port means; a change in state of a memory of the apparatus; a change in state of a processor of the apparatus; a reboot of the apparatus; an interface attribute change; a timeout; a user login; and a user logout. In some embodiments, the event characteristics comprise packet characteristics of the packets of data. In some embodiments, the packet characteristics comprise at least one of the group consisting of: destination addresses of the packets of data; source addresses of the packets of data; types of the packets of data; identifiers of network interfaces of the apparatus receiving the packets of data into the apparatus; identifiers of the network interfaces of the apparatus transmitting the packets of data from the apparatus; data rates of the packets of data; quantities of data in the packets of data; identifiers of network devices in the paths of the packets of data; and times of occurrence of the packets of data. In some embodiments, each of the event classification rules describes an event count condition and a threshold action, and the apparatus further comprises: action means for initiating the respective threshold action for each of the event classification rules when the respective event count meets the respective event counter condition. In some embodiments, the event count conditions describe at least one of the group consisting of: an occurrence of a predetermined count of the means for counting; a predetermined change in a count of the means for counting; and a predetermined change in the count of the means for counting during a predetermined interval. In some embodiments, the threshold actions comprise at least one of the group consisting of: implementing a further one of the event classification rules; closing one or more of the port means; changing logical attributes of one or more of the port means; manifesting an alarm indication; and dropping subsequent packets of data having the at least one of the packet characteristics described by the respective event classification rule. In some embodiments, at least one of the event classification rules includes a conditional statement. Some embodiments comprise a network switch comprising the apparatus. Some embodiments comprise a router comprising the apparatus. Some embodiments comprise a network interface controller comprising the apparatus.

In general, in one aspect, the invention features a method for an apparatus, the method comprising: exchanging packets of data with one or more networks; establishing a plurality of event classification rules in accordance with a user interface of the apparatus, wherein each of the event classification rules describes at least one event characteristic for an event in the apparatus, and wherein at least one of the event classification rules describes a plurality of the event characteristics; identifying events having the at least one event characteristic described by any of the event classification rules; and counting the identified events for respective ones of the event classification rules.

In some embodiments, the event characteristics comprise at least one of the group consisting of: a change in state of a port of the apparatus; a change in state of a memory of the apparatus; a change in state of a processor of the apparatus; a reboot of the apparatus; an interface attribute change; a timeout; a user login; and a user logout. In some embodiments, the event characteristics comprise packet characteristics of the packets of data. In some embodiments, the packet characteristics comprise at least one of the group consisting of: destination addresses of the packets of data; source addresses of the packets of data; types of the packets of data; identifiers of network interfaces receiving the packets of data; identifiers of the network interfaces transmitting the packets of data; data rates of the packets of data; quantities of data in the packets of data; identifiers of network devices in the paths of the packets of data; and times of occurrence of the packets of data. In some embodiments, each of the event classification rules describes an event count condition and a threshold action, and the method further comprises: initiating the respective threshold action for each of the event classification rules when a count of the respective identified events meets the respective event count condition. In some embodiments, the event count conditions describe at least one of the group consisting of: an occurrence of a predetermined count of the identified events; a predetermined change in a count of the identified events; and a predetermined change in a count of the identified events during a predetermined interval. In some embodiments, the threshold actions comprise at least one of the group consisting of: implementing a further one of the event classification rules; closing one or more ports of the apparatus; changing logical attributes of one or more ports of the apparatus; manifesting an alarm indication; and dropping subsequent packets of data having the at least one packet characteristic described by the respective packet classification rule. In some embodiments, at least one of the packet classification rules includes a conditional statement.

In general, in one aspect, the invention features a computer program for an apparatus, the computer program comprising: causing the apparatus to exchange packets of data with one or more networks; establishing a plurality of event classification rules in accordance with a user interface of the apparatus, wherein each of the event classification rules describes at least one event characteristic for an event in the apparatus, and wherein at least one of the event classification rules describes a plurality of the event characteristics; identifying events having the at least one event characteristic described by any of the event classification rules; and counting the identified events for respective ones of the event classification rules.

In some embodiments, the event characteristics comprise at least one of the group consisting of: a change in state of a port of the apparatus; a change in state of a memory of the apparatus; a change in state of a processor of the apparatus; a reboot of the apparatus; an interface attribute change; a timeout; a user login; and a user logout. In some embodiments, the event characteristics comprise packet characteristics of the packets of data. In some embodiments, the packet characteristics comprise at least one of the group consisting of: destination addresses of the packets of data; source addresses of the packets of data; types of the packets of data; identifiers of network interfaces receiving the packets of data; identifiers of the network interfaces transmitting the packets of data; data rates of the packets of data; quantities of data in the packets of data; identifiers of network devices in the paths of the packets of data; and times of occurrence of the packets of data. In some embodiments, each of the event classification rules describes an event count condition and a threshold action, further comprising: initiating the respective threshold action for each of the event classification rules when a count of the respective identified events meets the respective event count condition. In some embodiments, the event count conditions describe at least one of the group consisting of: an occurrence of a predetermined count of the identified events; a predetermined change in a count of the identified events; and a predetermined change in a count of the identified events during a predetermined interval. In some embodiments, the threshold actions comprise at least one of the group consisting of: implementing a further one of the event classification rules; closing one or more ports of the apparatus; changing logical attributes of one or more ports of the apparatus; manifesting an alarm indication; and dropping subsequent packets of data having the at least one packet characteristic described by the respective packet classification rule. In some embodiments, at least one of the packet classification rules includes a conditional statement.

The details of one or more implementations are set forth in the accompanying drawings and the description below. Other features will be apparent from the description and drawings, and from the claims.

Figure 1:
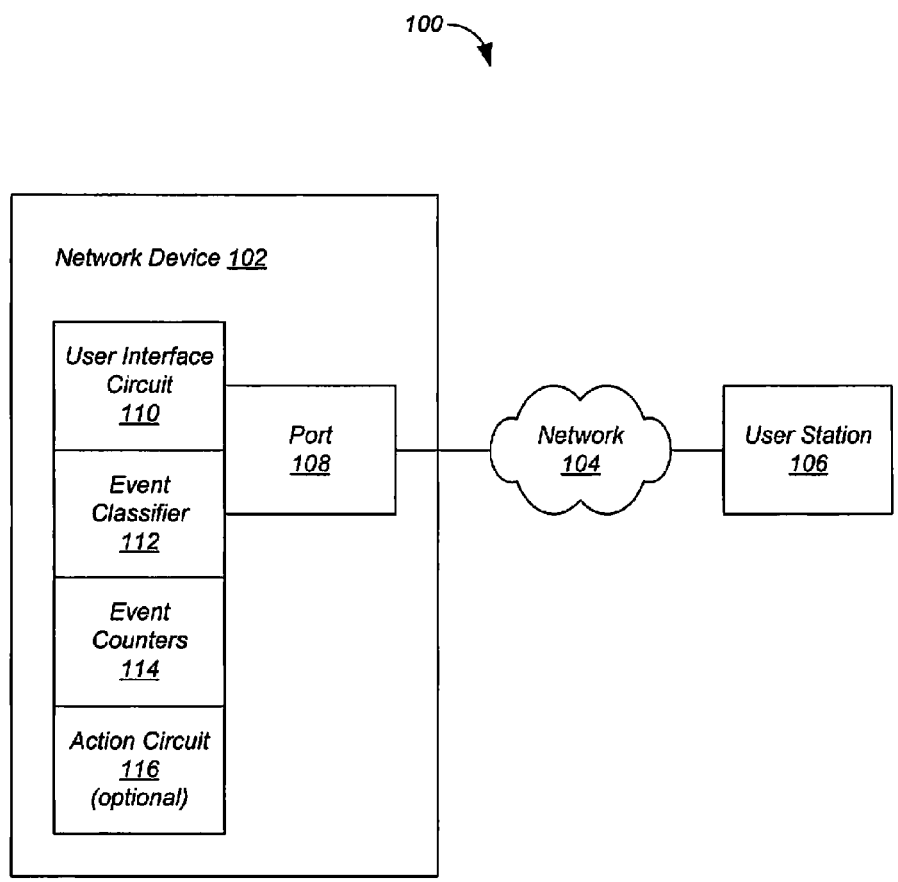
FIG. 1 shows a data communications system comprising a network device in communication with one or more networks, and in communication with a user station, preferably over the network(s).

The leading digit(s) of each reference numeral used in this specification indicates the number of the drawing in which the reference numeral first appears.

DETAILED DESCRIPTION

Embodiments of the present invention provide custom remote automatic monitoring for network devices. In a preferred embodiment, a user interface circuit allows a user to input event classification rules. Each event classification rule describes one or more event characteristics for an event in the network device. Each event classification rule optionally further describes an event counter condition and a threshold action. An event classifier identifies those events occurring in the network device and having the event characteristics described by any of the event classification rules. An event counter associated with each event classification rule is incremented (or decremented) whenever the event classifier identifies an event for that event classification rule. In some embodiments, when an event counter meets the respective event counter condition, the respective action is initiated. The actions can include, for example, manifesting an alarm indication, dropping subsequent packets having packet characteristics described by the respective packet rule, and the like.

FIG. 1 shows a data communications system comprising a network device 102 in communication with one or more networks 104, and in communication with a user station 106, preferably over network(s) 104. While embodiments of the present invention are described with respect to networks and packets of data, embodiments of the present invention are not so limited. For example, embodiments of the present invention can be used to transmit data, voice, video, and the like over powerlines, satellites, between Ultra-Wideband (UWB) handsets, and the like.

Network device 102 can be fabricated as one or more semiconductors, and can be implemented within a network switch, a router, a network interface controller, and the like. Network device 102 comprises one or more ports 108 to exchange packets of data with network 104. Network device 102 further comprises a user interface circuit 110, an event classifier 112, and event counters 114, and an optional action circuit 116, each of which can be implemented using hardware, software, or some combination thereof.

Figure 2:
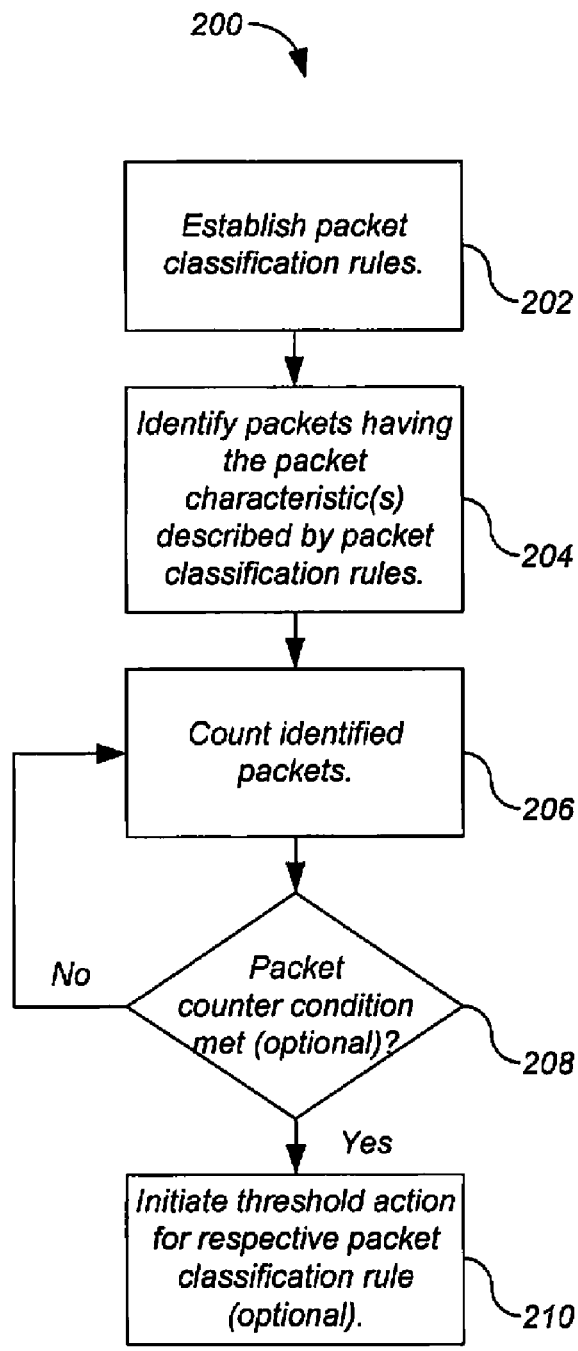
FIG. 2 shows a process for the network device of FIG. 1 according to a preferred embodiment of the present invention.

FIG. 2 shows a process 200 for network device 102 of FIG. 1 according to a preferred embodiment of the present invention. A user at user station 106 employs user interface circuit 110 of network device 102 to establish event classification rules (step 202). User interface circuit 110 can employ any sort of user interface, for example such as a web-based HTML page interface or the like.

Each of the event classification rules describes at least one event characteristic. Each of the event classification rules optionally further describes an event counter condition and a threshold action.

An event characteristic can describe any occurrence in network device 102. For example, an event characteristic can describe a change in state of a port 108 such as a loss or resumption of connectivity with network 104, a change in spanning tree mode, and the like. As another example, an event characteristic can describe a change in state of a memory or a processor of network device 102, such as a load above a certain percent, reboot/reload events, protocol internal state transitions, and the like. As a further example, an event characteristic can describe an interface attribute change, for example in speed, duplex, VLAN membership, membership in other internal logical groups such as quality of service (QoS) grade, and the like. As a further example, an event characteristic can describe a timeout event in general, or specific to some sub-function, such as how many times in talking to an external time-server or authentication-server a timeout resulted, and the like. As a further example, an event characteristic can describe characteristics of user login and logout, such as number, frequency, duration, time of day, and the like, for network users and system administrators together or separately.

Event characteristics can also describe packet characteristics of the packets sent and/or received by network device 102. The packet characteristics can include any characteristic of the packets, for example such as destination and source addresses of the packets, the type of packets (such as protocol and the like), identifiers of the network interfaces (such as ports, VLANs, and the like) receiving the packets into network device 102, identifiers of the network interfaces transmitting the packets from network device 102, data rates of the packets, quantities of data in the packets, identifiers of other network devices in the paths of the packets, times of occurrence of the packets, and the like.

Each event classification rule can describe more than one event characteristic. For example, an event classification rule could describe TCP SYN packets at a rate exceeding one per second in order to identify and alarm a denial of service attack using this technique.

Unlike conventional remote monitoring technologies, this rule-based approach enables complex rules to be implemented. For example, the event classification rules can include conditional statements such as if-then-else statements, and can even implement other event classification rules. For example, when the number of spanning-tree state changes in a port 108 exceeds a predetermined number, action circuit 116 can not only change the STP timers, but also add a new event classification rule that, when the number of BPDU packets received by that port 108 exceeds a predetermined number, starts forwarding copies of the BPDU's to a look-aside port for analysis.

Event classifier 112 examines each event within network device 102, and examines each packet sent or received by network device 102, and for each event classification rule, identifies the events having the event characteristic(s) described by the event classification rule (step 204). For event classification rules including conditional statements, event classifier 112 employs the conditional statements to identify events.

Each of the event classification rules is optionally associated with an optional event counter 114. Each event counter 114 counts the events identified by event classifier 112 for the associated event classification rule (step 206). When the count of an event counter 114 meets the event counter condition associated with the event classification rule associated with the event counter 114 (step 208), optional action circuit 116 optionally initiates the threshold action for that event classification rule (step 210).

The event counter conditions can describe, for example, an occurrence of a predetermined count of event counter 114, a predetermined change in the count of event counter 114, a predetermined change in the count of event counter 114 during a predetermined interval, and the like. The threshold actions can include, for example, manifesting an alarm indication, for example by sending an email to a system administrator, dropping subsequent packets having packet characteristic(s) described by the event classification rule, and the like. The threshold actions can also include enabling and disabling sub-functions and sub-systems of network device 102, for example by closing a port 108, changing the logical attributes of a port 108, changing quality of service (QoS) settings, and the like.

Referring now to FIGS. 3A-3E, various exemplary implementations of the present invention are shown.

Figure 3B:
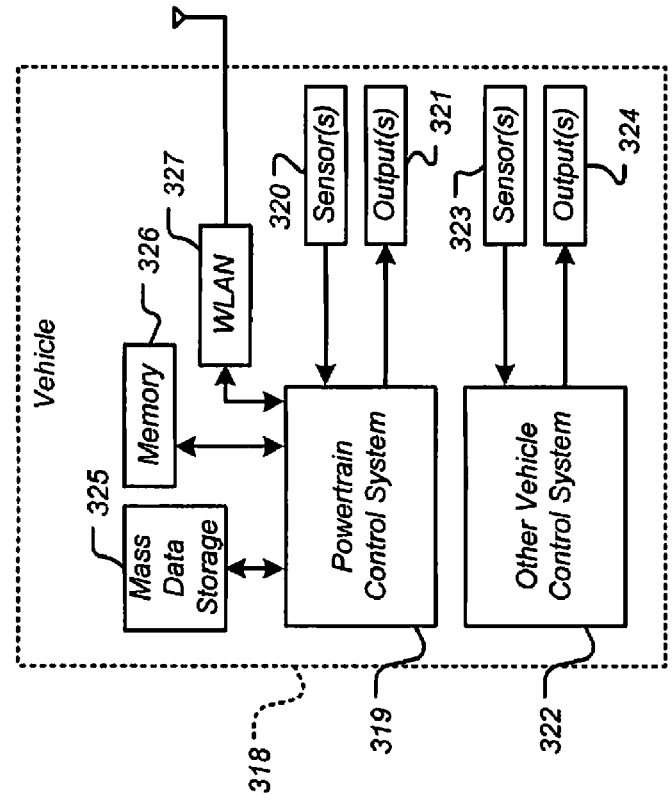
FIGS. 3A-3E show various exemplary implementations of the present invention.
Figure 3A:
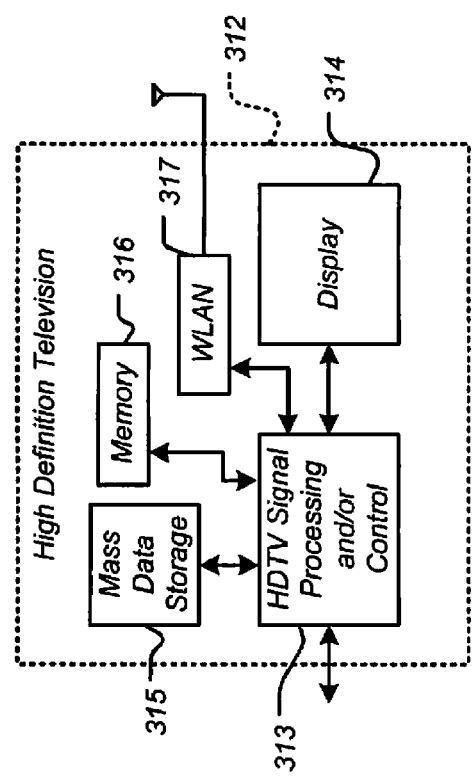

Referring now to FIG. 3A, the present invention can be implemented in a high definition television (HDTV) 312. The present invention may implement either or both signal processing and/or control circuits, which are generally identified in FIG. 3A at 313, a WLAN interface and/or mass data storage of the HDTV 312. The HDTV 312 receives HDTV input signals in either a wired or wireless format and generates HDTV output signals for a display 314. In some implementations, signal processing circuit and/or control circuit 313 and/or other circuits (not shown) of the HDTV 312 may process data, perform coding and/or encryption, perform calculations, format data and/or perform any other type of HDTV processing that may be required.

The HDTV 312 may communicate with mass data storage 315 that stores data in a nonvolatile manner such as optical and/or magnetic storage devices. The HDD may be a mini HDD that includes one or more platters having a diameter that is smaller than approximately 1.8". The HDTV 312 may be connected to memory 316 such as RAM, ROM, low latency nonvolatile memory such as flash memory and/or other suitable electronic data storage. The HDTV 312 also may support connections with a WLAN via a WLAN network interface 317.

Referring now to FIG. 3B, the present invention implements a control system of a vehicle 318, a WLAN interface and/or mass data storage of the vehicle control system. In some implementations, the present invention implements a powertrain control system 319 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 322 of the vehicle 318. The control system 322 may likewise receive signals from input sensors 323 and/or output control signals to one or more output devices 324. In some implementations, the control system 322 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 319 may communicate with mass data storage 325 that stores data in a nonvolatile manner. The mass data storage 325 may include optical and/or magnetic storage devices for example hard disk drives HDD and/or DVDs. The HDD may be a mini HDD that includes one or more platters having a diameter that is smaller than approximately 1.8". The powertrain control system 319 may be connected to memory 326 such as RAM, ROM, low latency nonvolatile memory such as flash memory and/or other suitable electronic data storage. The powertrain control system 319 also may support connections with a WLAN via a WLAN network interface 327. The control system 322 may also include mass data storage, memory and/or a WLAN interface (all not shown).

Figure 3C:
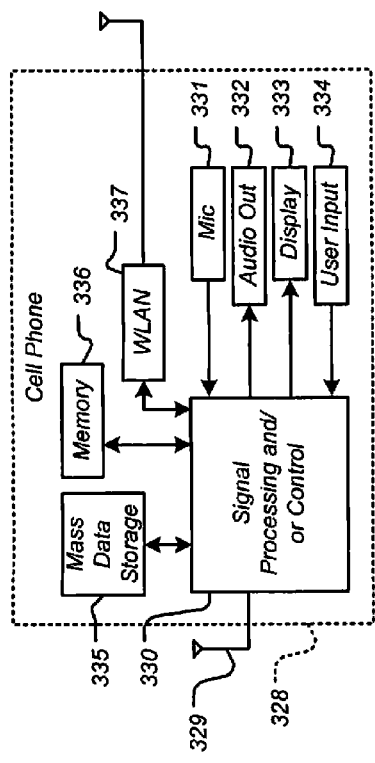

Referring now to FIG. 3C, the present invention can be implemented in a cellular phone 328 that may include a cellular antenna 329. The present invention may implement either or both signal processing and/or control circuits, which are generally identified in FIG. 3C at 330, a WLAN interface and/or mass data storage of the cellular phone 328. In some implementations, the cellular phone 328 includes a microphone 331, an audio output 332 such as a speaker and/or audio output jack, a display 333 and/or an input device 334 such as a keypad, pointing device, voice actuation and/or other input device. The signal processing and/or control circuits 330 and/or other circuits (not shown) in the cellular phone 328 may process data, perform coding and/or encryption, perform calculations, format data and/or perform other cellular phone functions.

The cellular phone 328 may communicate with mass data storage 335 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 328 may be connected to memory 336 such as RAM, ROM, low latency nonvolatile memory such as flash memory and/or other suitable electronic data storage. The cellular phone 328 also may support connections with a WLAN via a WLAN network interface 337.

Figure 3D:
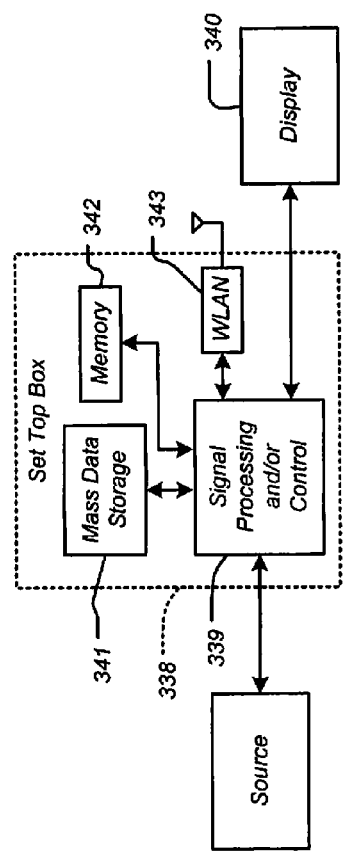

Referring now to FIG. 3D, the present invention can be implemented in a set top box 338. The present invention may implement either or both signal processing and/or control circuits, which are generally identified in FIG. 3D at 339, a WLAN interface and/or mass data storage of the set top box 338. The set top box 338 receives signals from a source such as a broadband source and outputs standard and/or high definition audio/video signals suitable for a display 340 such as a television and/or monitor and/or other video and/or audio output devices. The signal processing and/or control circuits 339 and/or other circuits (not shown) of the set top box 338 may process data, perform coding and/or encryption, perform calculations, format data and/or perform any other set top box function.

The set top box 338 may communicate with mass data storage 343 that stores data in a nonvolatile manner. The mass data storage 343 may include optical and/or magnetic storage devices for example hard disk drives HDD and/or DVDs. The HDD may be a mini HDD that includes one or more platters having a diameter that is smaller than approximately 1.8". The set top box 338 may be connected to memory 342 such as RAM, ROM, low latency nonvolatile memory such as flash memory and/or other suitable electronic data storage. The set top box 338 also may support connections with a WLAN via a WLAN network interface 343.

Figure 3E:
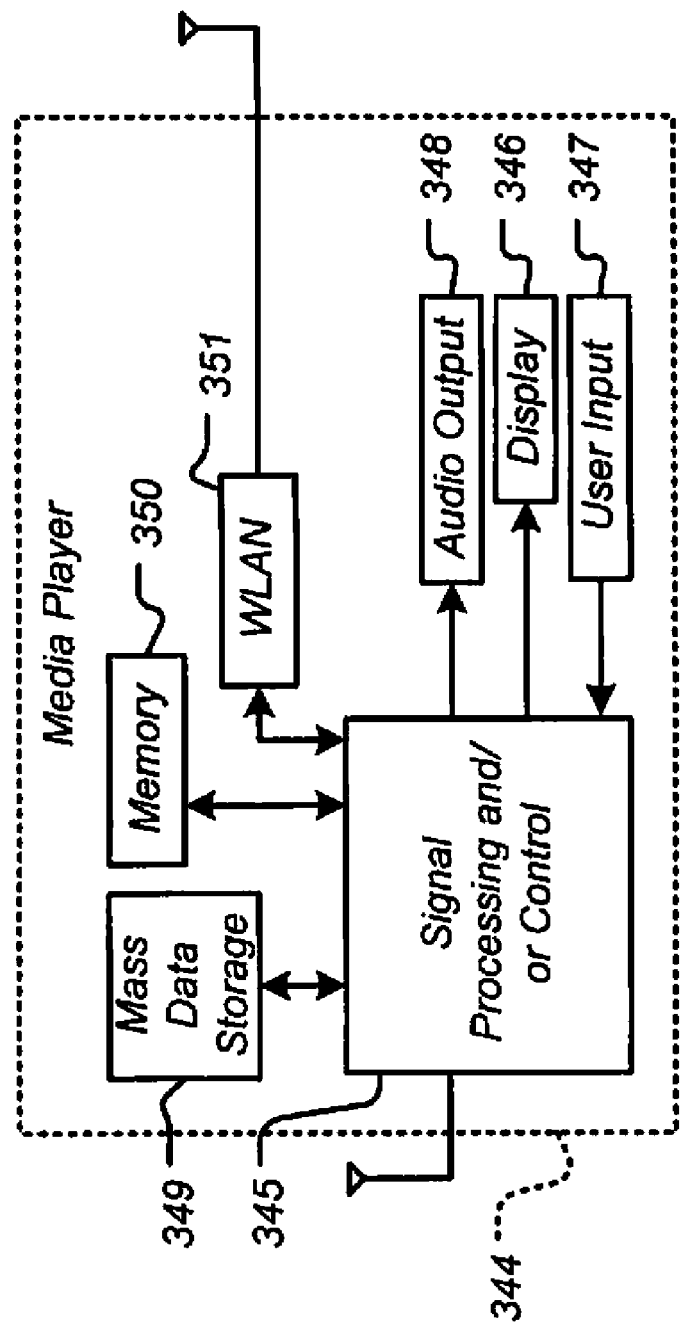

Referring now to FIG. 3E, the present invention can be implemented in a media player 344. The present invention may implement either or both signal processing and/or control circuits, which are generally identified in FIG. 3E at 345, a WLAN interface and/or mass data storage of the media player 344. In some implementations, the media player 344 includes a display 346 and/or a user input 347 such as a keypad, touchpad and the like. In some implementations, the media player 344 may employ a graphical user interface (GUI) that typically employs menus, drop down menus, icons and/or a point-and-click interface via the display 346 and/or user input 347. The media player 344 further includes an audio output 348 such as a speaker and/or audio output jack. The signal processing and/or control circuits 345 and/or other circuits (not shown) of the media player 344 may process data, perform coding and/or encryption, perform calculations, format data and/or perform any other media player function.

The media player 344 may communicate with mass data storage 349 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 344 may be connected to memory 350 such as RAM, ROM, low latency nonvolatile memory such as flash memory and/or other suitable electronic data storage. The media player 344 also may support connections with a WLAN via a WLAN network interface 351. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
    at least one port configured to exchange packets of data with one or more networks;
    a rule storing circuit configured to store a plurality of event classification rules, wherein:
        each of the event classification rules describes at least one event characteristic for an event in the network device,
        at least one of the event classification rules includes a change in state of the at least one port of the network device, and
        the change in state of the at least one port is generated by a change in spanning tree mode;
    an event classifier configured to identify events having the at least one event characteristic described by any of the event classification rules; and
    a plurality of event counters, wherein each of the event counters is configured to count the events identified by the event classifier for a respective one of the event classification rules.

2. The network device of claim 1, wherein each of the event classification rules describes an event counter condition and a threshold action.

3. The network device of claim 2, further comprising an action circuit configured to initiate a respective threshold action for each of the event classification rules when a respective event counter meets a respective event counter condition.

4. The network device of claim 2, wherein the event counter condition describes at least one of the group consisting of:
    an occurrence of a predetermined count of the event counter;
    a predetermined change in a count of the event counter; and
    a predetermined change in the count of the event counter during a predetermined interval.

5. The network device of claim 3, wherein the threshold action comprises at least one of the group consisting of:
    implementing a further one of the event classification rules;
    closing one or more ports;
    changing logical attributes of one or more ports;
    manifesting an alarm indication; and
    dropping subsequent packets of data having the at least one of the event characteristics described by a respective event classification rule.

6. The network device of claim 1, wherein at least one of the event classification rules includes a conditional statement including an if-then-else statement.

7. The network device of claim 1, further comprising a user interface configured to allow a user to input the plurality of event classification rules.

8. The network device of claim 7, wherein the user interface is configured to provide an interactive interface for a user of a network device remote from the network device for interactively configuring the network device via a network without storing information about packet flows in the user interface.

9. The network device of claim 7, wherein the user interface comprises a web-based interface including a hypertext markup language (HTML) interface.

10. The network device of claim 1, wherein
    at least one of the event classification rules describes a plurality of the event characteristics,
    at least two of the event characteristics are selected from a group including a reboot of the network device, a change in state of a processor of the network device, a change in state of a memory of the network device, a change in an attribute of a network interface of the network device, a user login, and a user logout.

11. The network device of claim 10, wherein the group further includes a timeout.

12. The network device of claim 10, wherein the group further includes packet characteristics of the packets of data.

13. The network device of claim 12, wherein the packet characteristics comprise at least one of the group consisting of:
    destination addresses of the packets of data;
    source addresses of the packets of data;
    types of the packets of data;
    identifiers of network interfaces of the network device receiving the packets of data into the network device;
    identifiers of the network interfaces of the network device transmitting the packets of data from the network device;
    data rates of the packets of data;
    quantities of data in the packets of data;
    identifiers of network devices in paths of the packets of data; and
    times of occurrence of the packets of data.

14. The network device of claim 10, wherein the change in state of one of the processor and the memory is generated by one of reboot events and reloading of programs of the network device.

15. The network device of claim 10, wherein the change in state of the at least one port is generated by one of a loss of connectivity with the one or more networks, and a resumption of connectivity with the one or more networks of the at least one port.

16. The network device of claim 10, wherein the attribute of the network interface includes one of a speed and a duplex mode of the network interface.

17. The network device of claim 10, wherein the event characteristics for the user login include one of a number of, a frequency, a duration, and a time of day of user logins.

18. The network device of claim 10, wherein the event characteristics for the user logout include one of a number of, a frequency, a duration, and a time of day of user logouts.

* * * * *